US009843487B2

(12) United States Patent
Mordani et al.

(10) Patent No.: US 9,843,487 B2
(45) Date of Patent: Dec. 12, 2017

(54) SYSTEM AND METHOD FOR PROVISIONING CLOUD SERVICES USING A HYBRID SERVICE MANAGEMENT ENGINE PLUGIN

(71) Applicant: ORACLE INTERNATIONAL CORPORATION, Redwood Shores, CA (US)

(72) Inventors: Rajiv Mordani, Sunnyvale, CA (US); Abhijit Kumar, Cupertino, CA (US); Nazrul Islam, Santa Clara, CA (US); Byron Nevins, Pacifica, CA (US); Chanda Rani Patel, Redwood Shores, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 414 days.

(21) Appl. No.: 14/207,256

(22) Filed: Mar. 12, 2014

(65) Prior Publication Data

US 2014/0280975 A1    Sep. 18, 2014

Related U.S. Application Data

(60) Provisional application No. 61/777,263, filed on Mar. 12, 2013.

(51) Int. Cl.
*H04L 12/24* (2006.01)
*H04L 29/08* (2006.01)

(52) U.S. Cl.
CPC .... *H04L 41/5041* (2013.01); *H04L 29/08648* (2013.01); *H04L 67/28* (2013.01); *H04L 41/5048* (2013.01); *H04L 41/5054* (2013.01)

(58) Field of Classification Search
CPC .......................... H04L 41/50; H04L 41/5041
See application file for complete search history.

(56) References Cited

U.S. PATENT DOCUMENTS 8,121,877 B2 *  2/2012  Chang ...................... G06F 8/72
                                                       705/7.11
8,312,419 B2 * 11/2012  Wilcock ................... G06F 8/10
                                                       717/104

(Continued)

OTHER PUBLICATIONS

Thanawala, et al., Oracle SaaS Platform: Building On-Demand Applications; An Oracle White Paper, Sep. 2008, 21 pages.

(Continued)

*Primary Examiner* — Jimmy H Tran
(74) *Attorney, Agent, or Firm* — Tucker Ellis LLP

(57) ABSTRACT

Described herein is a system and method for provisioning or controlling services using a hybrid service management engine (SME) plugin. In accordance with an embodiment, SMEs provide a means by which service types can be plugged into a cloud environment. For example, an SME can control a service-specific lifecycle, including provisioning, management, and monitoring of a service type. In accordance with an embodiment, an SME plugin associated with a service type can extend a hybrid SME plugin, to delegate one or more lifecycle operations to be controlled with shell or other scripts. Since a service provider can be associated with an SME that is used for the lifecycle and configuration of its services, the use of a hybrid SME plugin allows shell scripts to be leveraged to assist in the provisioning and control of those services.

20 Claims, 15 Drawing Sheets

(56) References Cited

U.S. PATENT DOCUMENTS

| | | | | |
|---|---|---|---|---|
| 2009/0092252 | A1* | 4/2009 | Noll | H04L 9/083 380/277 |
| 2012/0072985 | A1* | 3/2012 | Davne | H04L 63/0272 726/22 |
| 2013/0086578 | A1* | 4/2013 | Eilam | G06F 9/45558 718/1 |
| 2013/0124244 | A1* | 5/2013 | Johnson | G06Q 10/0631 705/7.12 |
| 2013/0191539 | A1* | 7/2013 | Sailer | H04L 67/34 709/225 |
| 2013/0268913 | A1* | 10/2013 | Anderson | G06F 8/70 717/120 |
| 2013/0332900 | A1* | 12/2013 | Berg | G06F 8/71 717/121 |
| 2015/0020059 | A1* | 1/2015 | Davis | G06F 8/60 717/171 |
| 2015/0074279 | A1* | 3/2015 | Maes | G06F 9/5072 709/226 |
| 2015/0244597 | A1* | 8/2015 | Maes | G06Q 10/10 715/736 |
| 2015/0326567 | A1* | 11/2015 | Hamburg | G06F 21/335 713/155 |

OTHER PUBLICATIONS

Piech, Platform-as-a-Service Private Cloud with Oracle Fusion Middleware, An Oracle White Paper, Oct. 2009, 20 pages.

Unknown Author, Cost Effective Security and Compliance with Oracle Database 11g Release 2, An Oracle White Paper, Mar. 2011, 14 pages.

Joshi, et al., Bridging the Divide between SaaS and Enterprise Datacenters, An Oracle White Paper, Feb. 2010, 18 pages.

McKendrick, Privatizing the Cloud, Oct. 2010, 33 pages, IOUG Survey on Cloud Computing.

Glas, et al., Achieving the Cloud Computing Vision, An Oracle White Paper in Enterprise Architecture, Oct. 2010, 22 pages.

Venkataraman, et al., Oracle's Cloud Solutions for Public Sector, An Oracle White Paper, Apr. 2011, 28 pages.

Unknown Author, Creating a Self-Service Devi-Test Cloud, A Case Study from Oracle Product Development IT, An Oracle White Paper, Jul. 2011, 12 pages.

Unknown Author, Oracle Exadata Database Machine, Security Overview, 2011, 2 pages.

Chauhan, et al., On-Demand Sourcing: Driving Costs Down and Value Up in a Period of Increased Business Volatility, Jun. 11, 2010, 5 pages.

Unknown Author, Oracle Identity Management 11g, 2010, 4 pages.

Silverstein, et al., Architectural Strategies for IT Optimization: From Silos to Clouds, An Oracle White Paper on Enterprise Architecture, May 2010, 21 pages.

Unknown Author, Oracle Optimized Solution for Enterprise Cloud Infrastructure, An Oracle Technical White Paper, Jun. 2011, 32 pages.

Wang, Oracle Cloud Computing, An Oracle White Paper, Jun. 2011, 16 pages.

Gulati, Cloud Management Using Oracle Enterprise Manager 11g, An Oracle White Paper, Apr. 2010, 25 pages.

Unknown Author, Accelerating Enterprise Cloud Infrastructure Deployments, 2011, 4 pages.

Wahl, et al., Oracle Advanced Security with Oracle Database 11g Release 2, Oracle White Paper, Oct. 2010, 12 pages.

Unknown Author, Reduce TCO and Get More Value from your X86 Infrastructure, 2011, 4 pages.

Unknown Author, Oracle Offers ISVs Comprehensive Platform to Deliver SaaS Applications, 2008, 2 pages.

Kumar, et al., The Most Complete and Integrated Virtualization: From Desktop to Datacenter, An Oracle White Paper, Oct. 2010, 13 pages.

* cited by examiner

SYSTEM AND METHOD FOR PROVISIONING CLOUD SERVICES USING A HYBRID SERVICE MANAGEMENT ENGINE PLUGIN

CLAIM OF PRIORITY

This application claims the benefit of priority to U.S. Provisional Application titled "PROVISIONING AND/OR CONTROLLING SERVICES WITH SHELL SCRIPTS USING A SHELL/HYBRID BASED SERVICE MANAGEMENT ENGINE (SME) PLUGIN", Application No. 61/777,263, filed Mar. 12, 2013; which above application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to cloud environments, and in particular a system and method for provisioning or controlling services using a hybrid service management engine plugin.

BACKGROUND

A cloud computing environment enables responsibilities which previously may have been provided by an organization's own information technology department, to be delivered as service layers within a cloud environment, for use by consumers that are either internal (i.e., private) or external (i.e., public) to the organization. In such environments, it is useful to be able to quickly and easily modify how a particular service should be configured during its provisioning, and subsequently controlled. These are generally the types of environments in which embodiments of the invention can be used.

SUMMARY

Described herein is a system and method for provisioning or controlling services using a hybrid service management engine (SME) plugin. In accordance with an embodiment, SMEs provide a means by which service types can be plugged into a cloud environment. For example, an SME can control a service-specific lifecycle, including provisioning, management, and monitoring of a service type. In accordance with an embodiment, an SME plugin associated with a service type can extend a hybrid SME plugin, to delegate one or more lifecycle operations to be controlled with shell or other scripts. Since a service provider can be associated with an SME that is used for the lifecycle and configuration of its services, the use of a hybrid SME plugin allows shell scripts to be leveraged to assist in the provisioning and control of those services.

DETAILED DESCRIPTION

In accordance with an embodiment, a cloud computing environment enables responsibilities which previously may have been provided by an organization's own information technology department, to be delivered as service layers within a cloud environment, for use by consumers that are either internal (i.e., private) or external (i.e., public) to the organization. Described herein are a variety of hardware and/or software components and features, which can be used in delivering an infrastructure, platform, and/or applications to support cloud computing.

Figure 1:
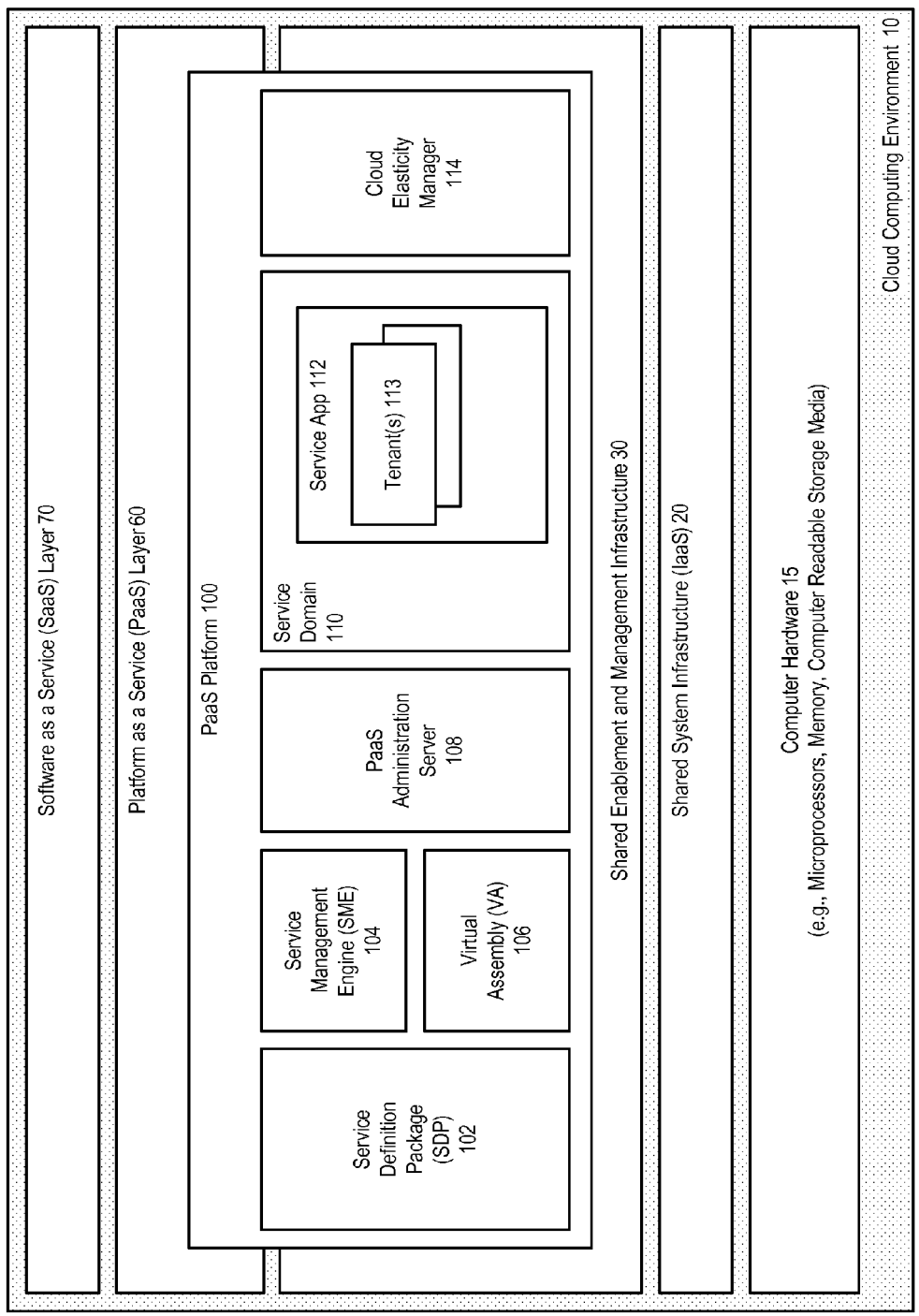
FIG. 1 illustrates a system which can utilize a hybrid service management engine plugin, in accordance with an embodiment.

FIG. 1 illustrates an example of a cloud computing environment, in accordance with an embodiment. As shown in FIG. 1, a cloud computing environment (referred to herein in some embodiments as a cloud environment, or cloud) 10 can generally include a combination of one or more Infrastructure as a Service (IaaS) 20, Platform as a Service (PaaS) 60, and/or Software as a Service (SaaS) 70 layers, which can be delivered as service layers within the cloud environment. The cloud environment can be implemented as a system that includes a computer hardware 15, such as one or more conventional general purpose or specialized digital computers, computing devices, machines, microprocessors, memory and/or computer readable storage media.

In accordance with an embodiment, each of the IaaS, PaaS, and/or SaaS layers can generally include a variety of components. For example, in accordance with an embodiment, the IaaS layer can include a shared database hardware (e.g., an Exadata machine), and/or shared application server hardware (e.g., an Exalogic machine); while the PaaS layer can include one or more PaaS services, such as a database service, application server service, and/or WebCenter service; and the SaaS layer can include various SaaS services, such as enterprise applications (e.g., Oracle Fusion SaaS), and/or ISV or custom applications. The cloud environment can also include a shared enablement and managing infrastructure 30, which provides enablement and management tools that support the various service layers, for example, identity management, virtual assembly builder, system provisioning, tenant management, or other components.

In accordance with an embodiment, the cloud environment can include a PaaS platform component 100 (referred to herein in some embodiments as a PaaS platform, or CloudLogic), which enables the provisioning of enterprise software applications within the environment. For example, the PaaS platform can be provided as an installable software suite that provides a self-service provisioning experience for enterprise applications such as Fusion Middleware (FMW).

As shown in FIG. 1, in accordance with an embodiment, the PaaS platform can include one or more service definition package (SDP) 102, service management engine (SME) 104, virtual assembly (VA) 106, PaaS administration server 108, service domain 110 including one or more service applications (apps) 112 for use by one or more cloud accounts or tenants 113, and/or elasticity manager 114 components.

The example shown in FIG. 1 is provided as an illustration of an exemplary cloud environment and PaaS platform. In accordance with other embodiments, different and/or other types or arrangements of components can be included.

In accordance with an embodiment, the following terms are used herein.

PaaS Platform Component (PaaS Platform, Platform, CloudLogic): In Accordance with an embodiment, a PaaS platform component is an installable software suite that provides a self-service provisioning experience for enterprise applications, such as FMW or other enterprise applications.

Site: In accordance with an embodiment, a site is the entity created and configured by the Platform Administrator from a PaaS platform installation, which tenants and Platform Administrators interact with to perform the various operations in the platform. In accordance with an embodiment, a site can be implemented as a WebLogic domain.

Tenant: In accordance with an embodiment, a tenant (referred to herein in some embodiments as an account) is an entity that is associated with users that consume the platform as a service, and establishes an administrative scope that administrators use to access PaaS services. For example, a tenant can be created for an organization, department, or group. Roles such as Tenant Administrator can be associated with a tenant; and quotas can be assigned to a tenant. A tenant can create one or more environments, and have one or more sub-tenants. Consumed resources, such as services with their virtual machines, databases, DNS entries, load balancer and other configurations, can be associated with a tenant.

Sub-Tenant: In accordance with an embodiment, a sub-tenant is an entity that exists under a tenant. A sub-tenant has a quota assigned from the overall tenant's quota. For example, a tenant can have one or more sub-tenants, and the Tenant Administrator can assign a quota from the overall tenant quota to each sub-tenant. A sub-tenant can create one or more environments.

Service Definition Package: In accordance with an embodiment, a service definition package (SDP) is a package that contains the information necessary for a particular type of service to be offered by the PaaS platform. For example, each type of FMW service can provide its own SDP. An SDP can contain custom code that is installed into the cloud platform, and a virtual assembly that contains the topology and configuration of a set of virtual appliances that will comprise a running instance of the service, upon being deployed onto a set of virtual machines (VMs).

Service Management Engine: In accordance with an embodiment, a service management engine (SME) provides a generic means to plug any service type into the system. For example, an SME takes care of the service-specific provisioning, lifecycle, management, and monitoring support for a service type or provider type.

Service Type: In accordance with an embodiment, a service type is a representation of software functionality that can be instantiated within the PaaS platform site for a tenant. A service type is created based on an SDP, with additional configuration information supplied by the Platform Administrator. Some of this configuration information may supply values that are specific to an installation of the PaaS platform product or the enterprise in which it is running; while some configuration information may reflect the Platform Administrator's choices of options supported by the SDP. Multiple service types can be created from a single SDP, by making different configuration choices.

Environment: In accordance with an embodiment, an environment is a collection of services and their associated providers that are managed together as a group. An environment can be created for the purpose of running an application or providing some higher level service. Environments provide the ability to operate on the collection of services as a whole, with operations such as start, stop, backup, and destroy. An environment provides the functions of an association group, and a management group.

Service: In accordance with an embodiment, a service is an instantiation of a service type. An environment can be associated with multiple services; and within a particular tenant there can be one or more environments with multiple services for a single service type. Typically, a service provides both a service administration interface, and an end-user interface. A service can be associated with identity, database, or other service features that are required by the service; and with a service runtime that runs on one or more VMs.

Provider Type: In accordance with an embodiment, a provider type is a special form of service type that supports providers instead of services. Provider types are created by the Platform Administrator in the same way as service types. As with service types, a provider type is created based on an SDP, with additional configuration information supplied by the Platform Administrator. Some of this configuration information may supply values that are specific to this installation of the PaaS platform product or the enterprise in which it is running; while some configuration information may reflect the Platform Administrator's choices of options supported by the SDP. Multiple provider types can be created from a single SDP, by making different configuration choices.

Provider: In accordance with an embodiment, a provider is a specialization of a service. Unlike services, which are created by explicit action of a Tenant Administrator, providers are created on-demand to satisfy the dependencies of services. A provider is an instantiation of a provider type, and represents the use of the resource managed by the provider type by a particular instance of a service type. Services can be associated with multiple providers. When creating a service, an orchestration engine matches the requirements of a service type with the capabilities of the configured provider types, and then requests the service type to create an instance of a service, and the provider types to create instances of the providers for use by this instance of the service. The orchestration engine then associates the service with the providers.

Association Resource: In accordance with an embodiment, an association resource (sometimes referred to as a provider resource) enables a service to keep track of configuration information for a particular association. For example, if a Java Service is associated with two different database providers, it may need to create a connection pool for each database. The association resource enables the Java Service to keep track of which connection pool is associated with which database, so that, if the orchestration engine needs to change one of the associations, the Java Service will know which connection pool to change.

Runtime: In accordance with an embodiment, a runtime is a representation of the installed and operational software that provides the functionality of a service or a provider. Runtimes are managed by the custom code included in an SDP, in some instances using facilities provided by the PaaS platform, such as its virtualization and provisioning support. Runtimes can be layered, with each layer being shared (multi-tenant), or not shared (dedicated). For example, with a Java Service, the runtime layers may include an application server, a Java virtual machine (JVM), a guest operating system (OS), and a host operating system. When unqualified, the expression "service runtime" generally refers to the top-most layer. For example, a multi-tenant service runtime is a runtime that is shared by multiple services; while a dedicated service runtime is a runtime that is not shared among multiple services.

Service Resource Type: In accordance with an embodiment, a service resource type is a special form of service type that supports service resources instead of services. Service resource types are created by the Platform Administrator in the same way as service types. As with service types, a service resource type is created based on an SDP, with additional configuration information supplied by the Platform Administrator. Multiple service resource types can be created from a single SDP, by making different configuration choices.

Service Resource: In accordance with an embodiment, a service resource is a specialization of a service. Unlike services, which are created by explicit action of a Tenant Administrator, and providers which are created on-demand to satisfy the dependencies of services, service resources are associated with services to satisfy the dependencies of artifacts/applications deployed to services. A service resource can be associated, or disassociated, with a service after the service has been created. A service resource dependency of a service is optional and may be configured by the Platform or Tenant Administrator based on the needs of the artifacts/applications that would be deployed to the service. For example, a service may indicate support for multiple kinds of service resource dependencies; and the Platform or Tenant Administrator may associate multiple service resources for a dependency. A service resource is an instantiation of a service resource type, and represents the use of the infrastructure managed by the service resource type, by a particular instance of a service type. A Service can be associated with one or more service resources. The association of a service to a service resource can happen at any time in the lifecycle of the service, once the service and service resource have been created.

Quota: In accordance with an embodiment, a quota provides a mechanism to limit consumption of a resource, by establishing an upper bound on the resource usage. Examples of quota-controlled resources include CPU, disk, and the number of VMs in use. PaaS layer quotas can also be supported, for example the number of services that can be provisioned. Quotas can be assigned to tenants, and a Tenant Administrator can allocate their quota to projects or groups which they manage.

Namespaces: In accordance with an embodiment, the PaaS platform can use a naming hierarchy, such as a Nimbula-style naming hierarchy and multipart naming scheme. There can be reserved namespaces for SDPs, service-types, provider-types, service-resource-types, service-resources, environments, and services. Namespaces can be defined and reserved at the global level, and per tenant.

Platform Administrator/System Administrator (Role): In accordance with an embodiment, a Platform or System Administrator is responsible for installing, configuring, managing, and maintaining the PaaS platform infrastructure and environment, including the resources that are made available to applications running in the environment. The Platform or System Administrator is also responsible for downloading and installing SDPs to support additional service types, setting up or configuring virtualization technology for the platform to use, and installing and configuring providers.

Cloud Account Administrator (Role): In accordance with an embodiment, a Cloud Account Administrator is responsible for the provisioning of new services, management of generic service properties such as their Quality of Service (QoS) settings and their associations, and the locking and termination of services. A Cloud Account Administrator can assign Service Administrators for each service.

Tenant Administrator (Role): In accordance with an embodiment, a Tenant Administrator is responsible for creating sub-tenants and assigning Tenant Administrator to the sub-tenant groups, and for the provisioning of new services, management of generic service properties, and the locking and termination of services. A Tenant Administrator can assign Service Administrators for each service.

Service Administrator (Role): In accordance with an embodiment, a Service Administrator is responsible for administering and managing a specific service after it has been provisioned. A Service Administrator interacts with the service's administration interface to perform administration and management operations.

Service Runtime Administrator (Role): In accordance with an embodiment, a Service Runtime Administrator is responsible for configuring and managing service runtimes.

Application Deployer (Role): In accordance with an embodiment, an Application Deployer deploys an application to the provisioned service, and is responsible for installing, configuring, and running the application. Once the application is running, it can be made available to an End User.

End User (Role): In accordance with an embodiment, an End User is the user of the applications that are deployed to the service. The End User interacts with the user interface provided by the application running in the service. If the service itself provides an interface for users to consume the functionality that it exposes, then the End User can use that service's interface.

Figure 2:
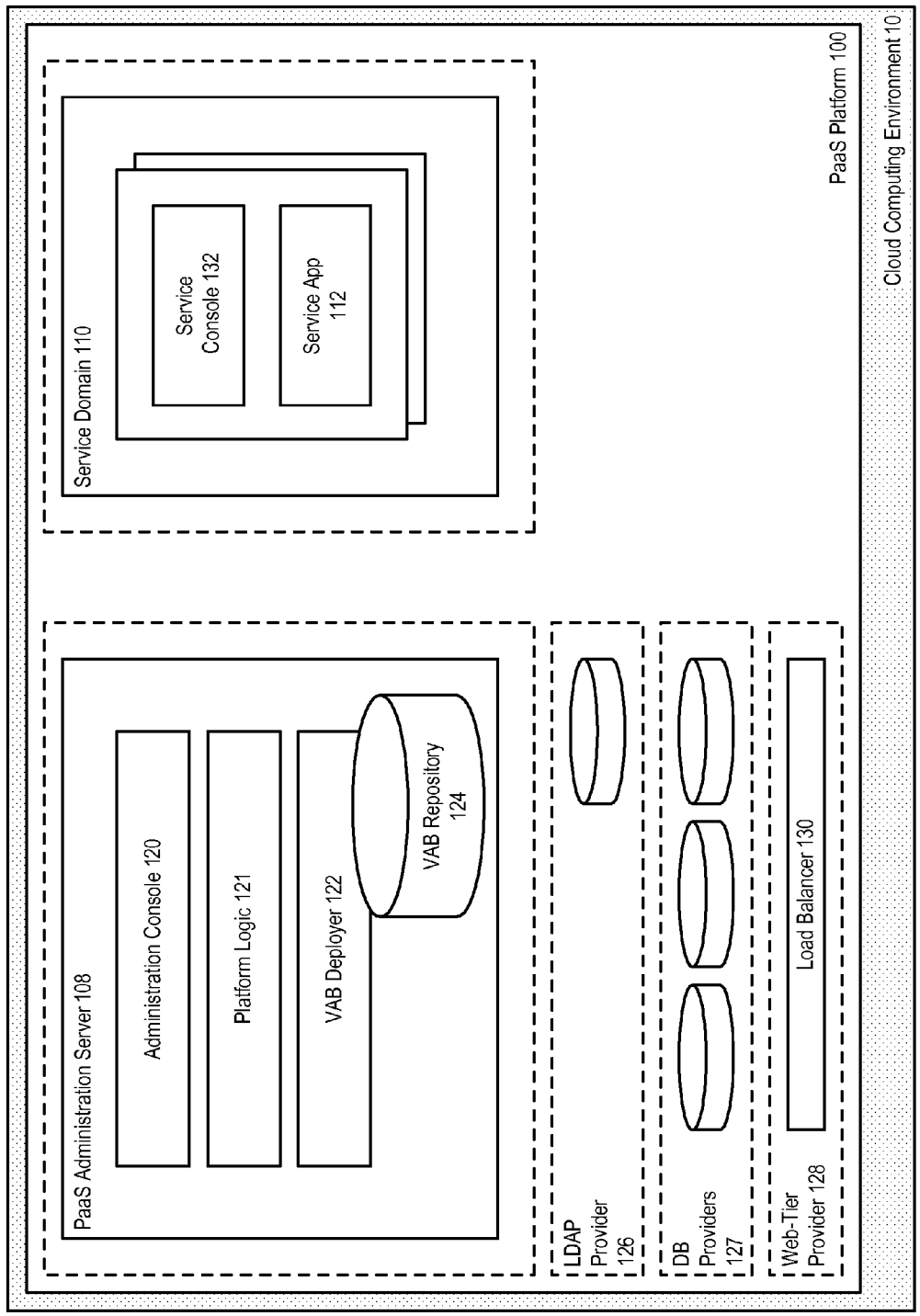
FIG. 2 illustrates a PaaS platform component, including an administration server and a service domain, in accordance with an embodiment.

FIG. 2 illustrates an administration server and a service domain, in accordance with an embodiment. As shown in FIG. 2, in accordance with an embodiment, the PaaS platform (platform) comprises a PaaS administration server 108, which supports an administration console 120, cloud platform provisioning/management logic 121, and virtual assembly builder (VAB) deployer 122, together with a virtual assembly or VAB repository 124. The VAB deployer can be provided by functionality, components, or products such as Oracle Virtual Assembly Builder (OVAB). The VAB deployer (e.g., OVAB Deployer) can then be used by the platform to manage those VMs that will host the servicing applications.

In accordance with an embodiment, the PaaS administration server can be implemented as a WebLogic (WLS) server application, together with, e.g., Glassfish modules embedded therein to provide cloud platform functionality. A service domain, including a service app and service console 132, can be provided for housing enterprise applications, such as FMW applications, that will ultimately service user requests. In accordance with an embodiment, the service domain components may be instantiated multiple times as part of provisioning requests.

In accordance with an embodiment, provider server types that will be used by the PaaS administration server and the service domain, examples of which include LDAP 126, database 127, and load-balancer 128 providers, can be provided in pools that are not provisioned by the administration server, but are external services registered with the cloud environment. In accordance with an embodiment, the PaaS platform can make use of a load-balancer provider to forward all incoming, e.g., Web requests, that are directed to the services. For example, each service can be associated with a virtual host name that will be registered with the load-balancer provider during service provisioning.

Figure 3:
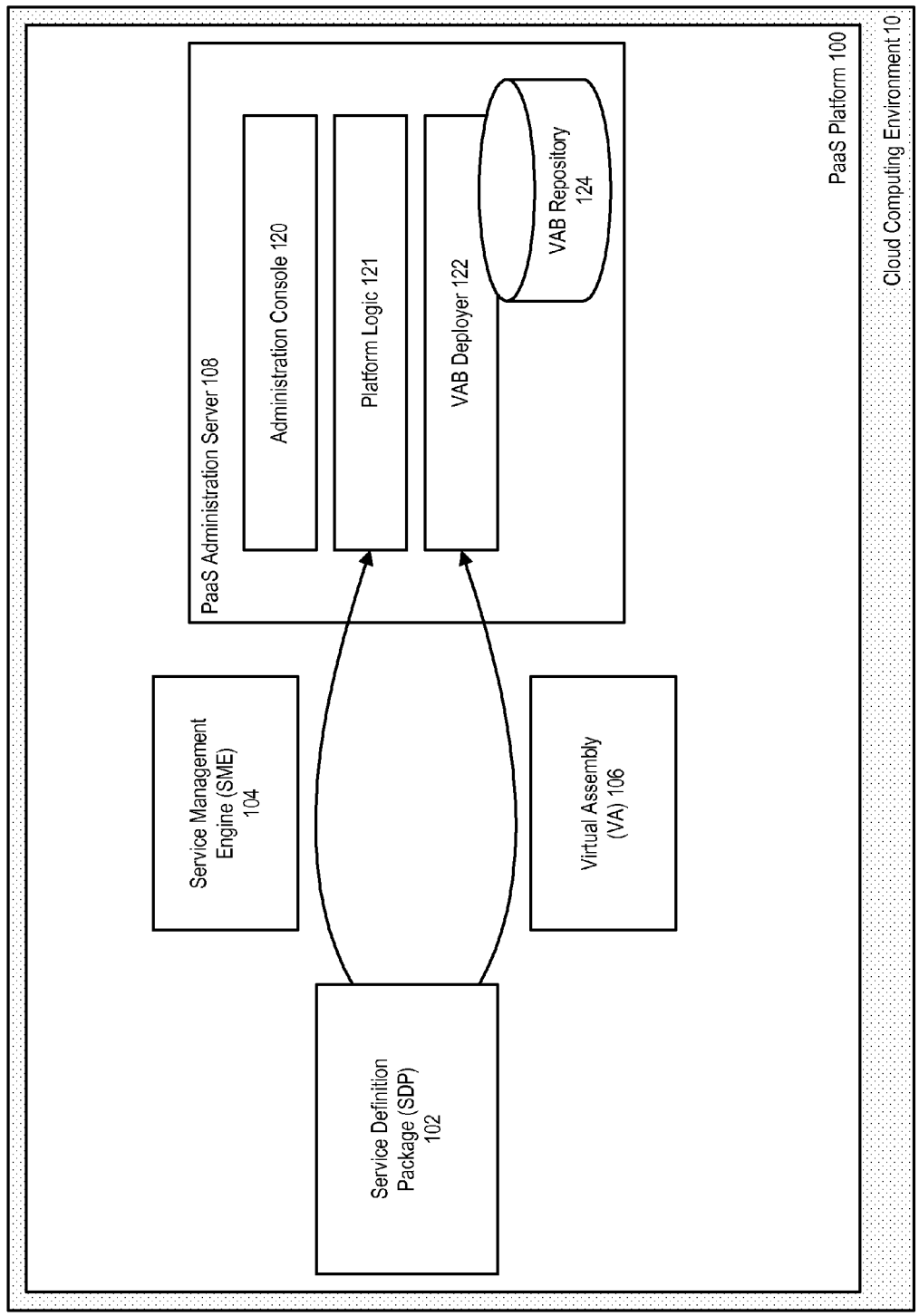
FIG. 3 illustrates the use of service definition packages and service management engines with an administration server, in accordance with an embodiment

FIG. 3 illustrates the use of service definition packages and service management engines with an administration server, in accordance with an embodiment. As shown in FIG. 3, in accordance with an embodiment, new enterprise application service types (e.g., new FMW service types), which the administrator wishes to make available for use within the PaaS platform, can be installed from an SDP. Each SDP contains custom code that can be injected into the platform, for use in supporting, e.g., elasticity and provisioning; together with a virtual assembly (e.g., an OVAB assembly) that contains the topology and configuration of a set of virtual appliances that will comprise a running instance of the enterprise application service, once the assembly is deployed onto a set of VMs.

Figure 4:
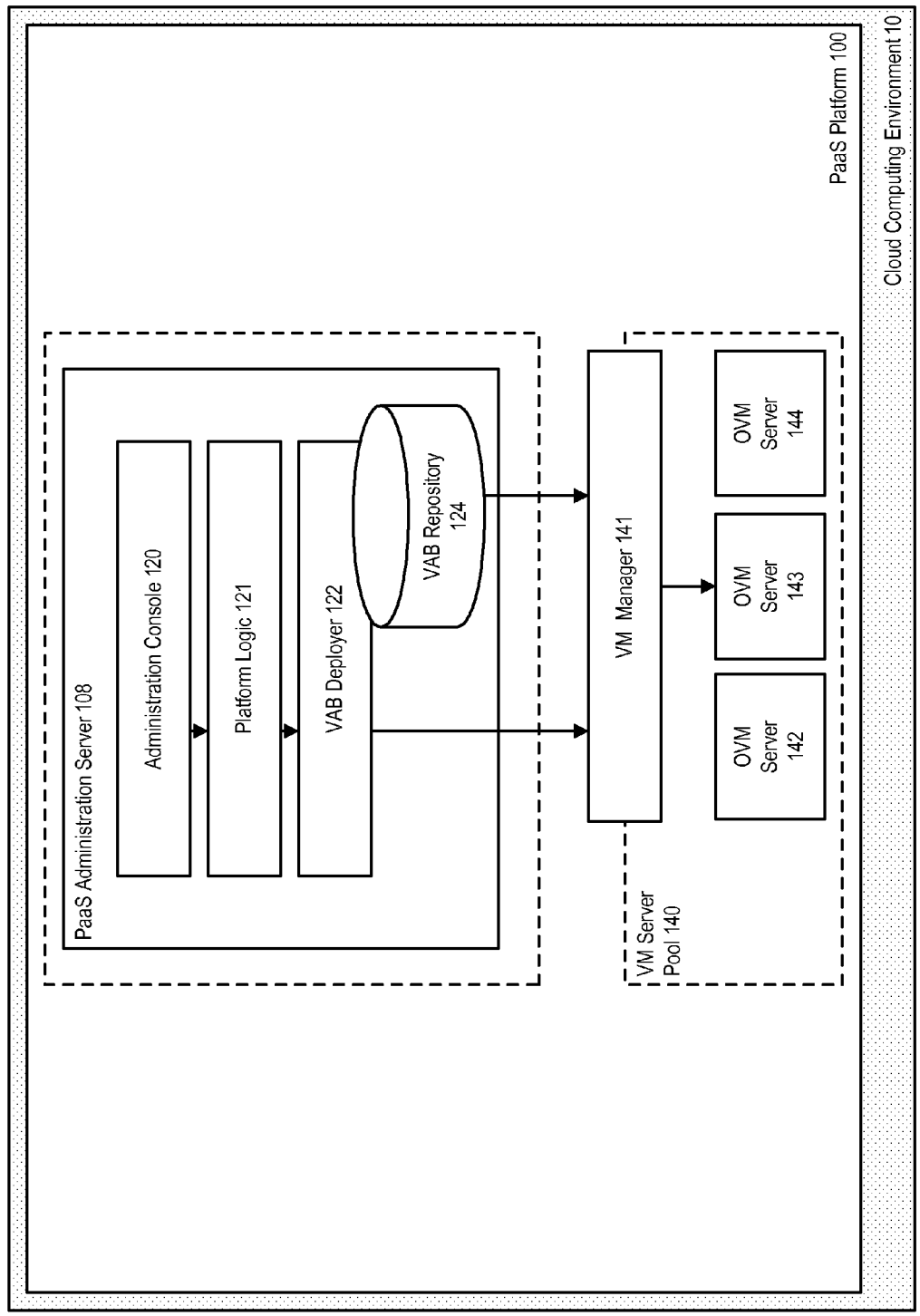
FIG. 4 illustrates the interaction between an administration server and a virtualization manager, in accordance with an embodiment

FIG. 4 illustrates the interaction between an administration server and a virtualization manager, in accordance with an embodiment. As shown in FIG. 4, in accordance with an embodiment, a VM manager component 141 (e.g., Oracle's OVM Manager) can be used by the PaaS platform to manage the pool 140 of VMs 142, 143, 144, which are then used in instantiating a service assembly. When a request is made from a platform module to instantiate an assembly, or a single appliance in the case of a scale-up request, the VAB deployer application (e.g., OVAB Deployer) can interact with the VM manager to fulfill the request. By delegating the infrastructure/virtualization responsibilities to the VM manager and VAB deployer in this manner, the platform can be abstracted from the target deployment platform.

Figure 5:
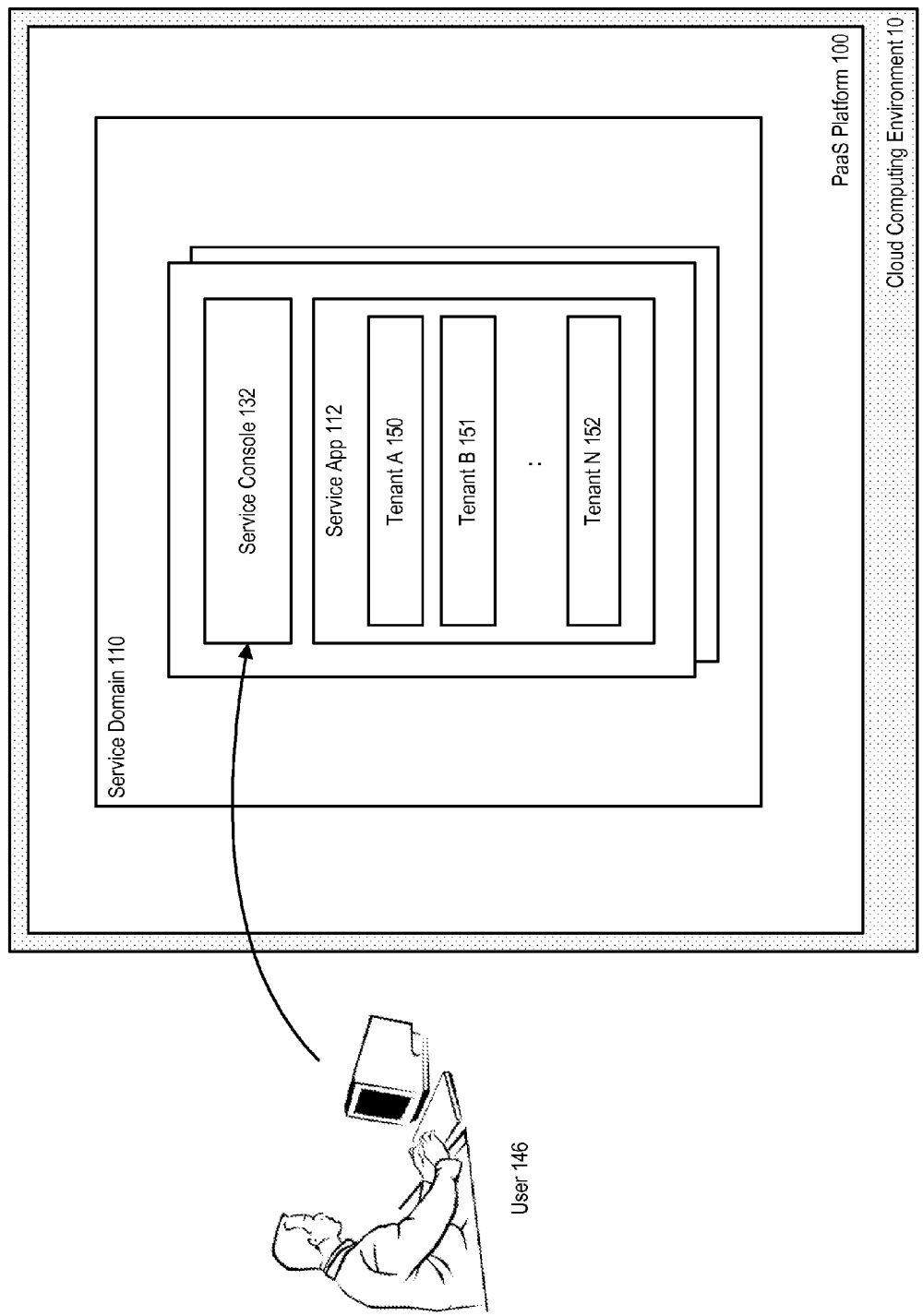
FIG. 5 illustrates a multiple tenant service domain, in accordance with an embodiment.

FIG. 5 illustrates a multiple tenant service domain, in accordance with an embodiment. As shown in FIG. 5, in accordance with an embodiment, a service domain can include multiple tenants 150, 151, 152, that are configurable using the service console. Multi-tenancy, like virtualization, is a density optimization that allows the use of less resources to support more clients and, similar to virtualization, should be transparent to the applications themselves. Although multi-tenancy involves the use of shared resources, the sharing need not be part of the logical model of the applications—these models are instead referred to as using "multitenant" and "dedicated" resources. Alternatively, applications may share resources in a manner that is part of the logical model of the applications; for example, two applications may purposely access a shared database because they intend to operate on the same data—these models are referred to as using "shared" and "unshared" resources.

In accordance with an embodiment, some service types may support both dedicated and multitenant uses, based on their particular configuration. Other service types may support either only dedicated use, or only multitenant use. Service types that are able to support multiple tenants on the same runtime can provision their runtimes in a multitenant manner, during the instantiation process, based on the configuration of the service type. A single instantiated service runtime that has been marked as multitenant-capable will be reused for a finite number of additional service provisioning requests, as determined by the service type and based on its configuration. Generally, it is left to the service application to support a particular tenancy mode; service applications that are not multitenant will only be able to support a single account for each service instance. Once a service has been instantiated from its VM assembly, end users 146 can interact with the system and the instantiated services, in the same manner as they would interact with an on-premise version of that service.

Figure 6:
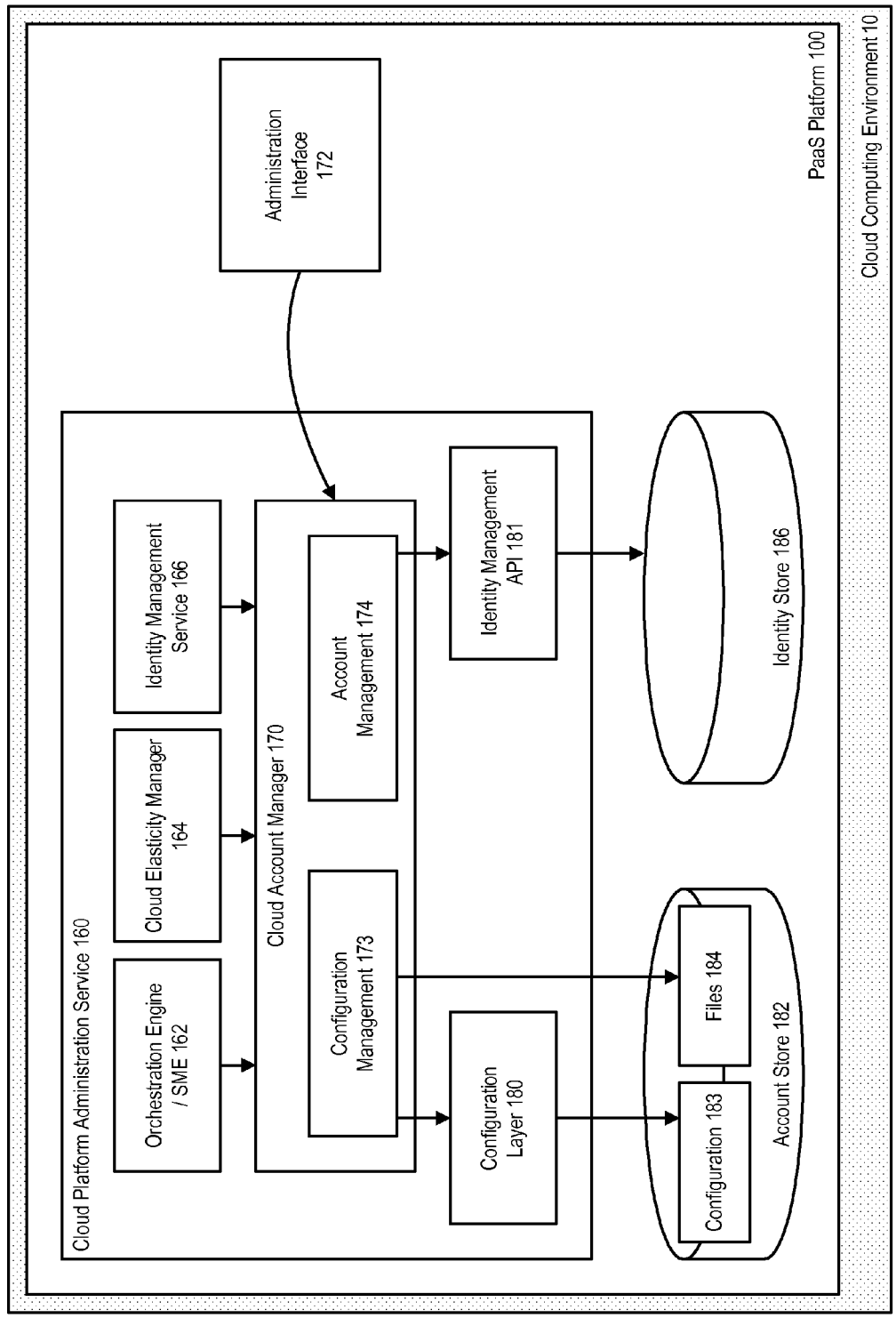
FIG. 6 illustrates a cloud account manager, in accordance with an embodiment

FIG. 6 illustrates a cloud account manager, in accordance with an embodiment. As shown in FIG. 6, in accordance with an embodiment, the PaaS platform can include a cloud platform administration service (CPAS) 160, together with a cloud account manager 170 which supports functions such as account management, and provides a framework that other modules, such as the orchestration engine/SMEs 162, cloud elasticity manager (CEM, referred to herein in some embodiments as an elasticity manager) 164, or identity management service 166), can use to access account-specific data. A configuration management component 173 can use a configuration layer 180 to persist account specific configuration 183 and other files 184 to an account store 182. An account management module 174 provides the ability to manage accounts for a CPAS domain, which can be exposed through the use of a command-line, REST, or other identity management application program interface (API) 181.

In accordance with an embodiment, users can either be managed within an identity store 186 managed by the PaaS platform, or alternatively can be provided from an external, e.g., corporate LDAP, or other means of user identification; and can access the cloud account manager through an administration interface 172. Account and configuration data can also be stored on a file system or other means of storage that is accessible from nodes of a CPAS cluster.

Service Definition Package (SDP)

Figure 7:
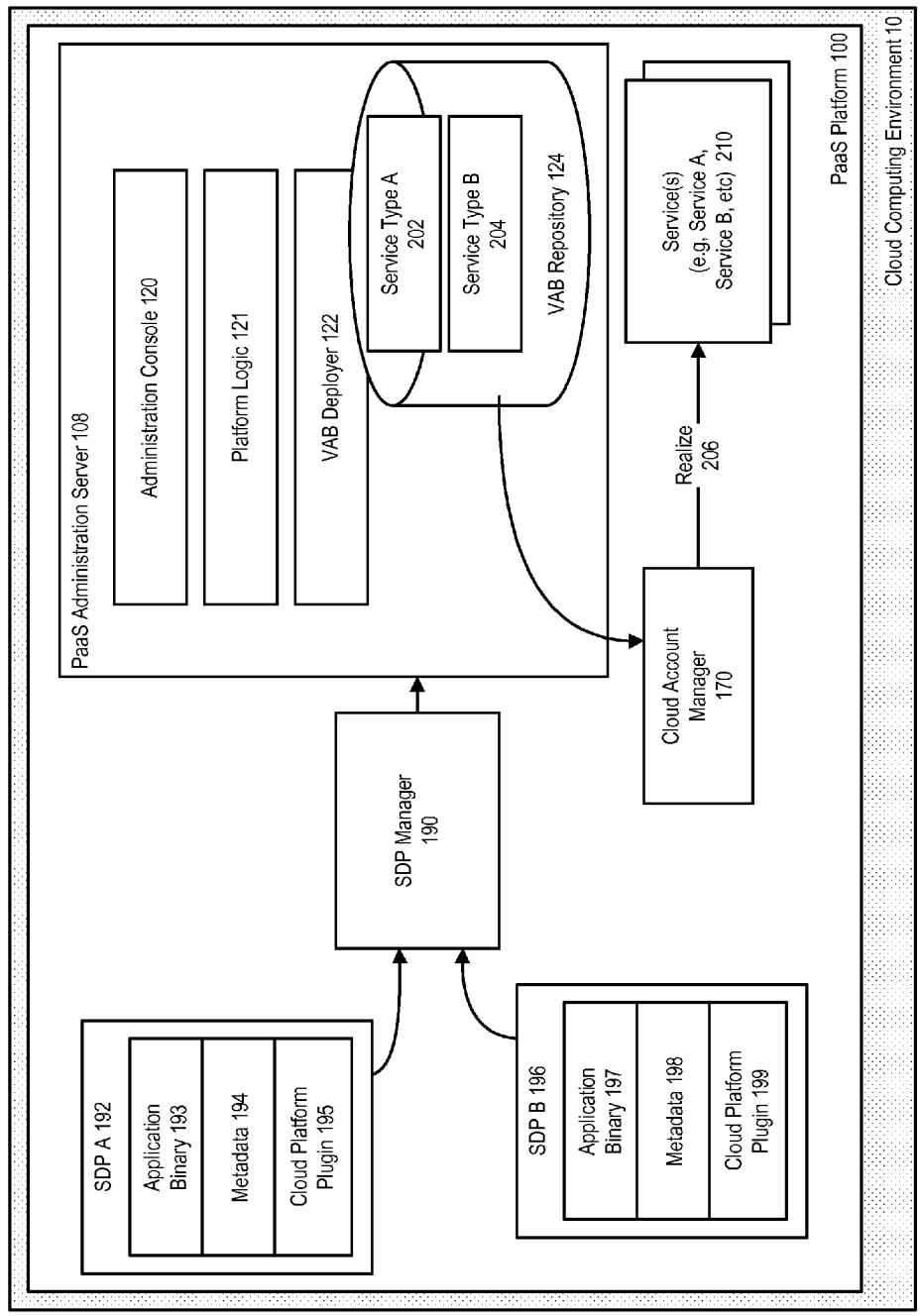
FIG. 7 illustrates the use of a service definition package, in accordance with an embodiment.

FIG. 7 illustrates the use of a service definition package, in accordance with an embodiment. As shown in FIG. 7, in accordance with an embodiment, each SDP 192, 196 can include a binary 193, 197; a metadata 194, 198 (e.g., the SDP name, service type, version, vendor, or virtualization support metadata such as indicating whether the SDP supports OVAB, EC2, or Native); and one or more plugins 195, 199 that enable the SDP to be used within a PaaS platform or cloud environment.

For example, in accordance with an exemplary embodiment, each SDP can include an assembly, reference, package, archive, or template, which can be used to install a service on a particular virtualization provider (e.g., OVAB); an assembly bundled within the SDP or a reference to an assembly (e.g., an EC2-specific reference); a service management engine (SME) plugin for the service type, which enables platform functionality such as elasticity metric gatherers, or alerts to be used with the service; a plugin for use with a VAB deployer (e.g., OVAB Deployer) during its assembly rehydration process; and other dependency and configuration information, such as scalability limits or whether the service is a multitenant or dedicated service.

In accordance with an embodiment, installing an SDP will install, e.g., the OVAB assembly into the OVAB repository; appropriate SME plugins will be registered with the cloud platform; and metric gatherers, alerts and actions will be installed in the PaaS platform. After a System Administrator installs the SDP, a Cloud Account Administrator can then use a cloud account administration interface to request for a service of that type.

In accordance with an embodiment, when an SDP is installed into a PaaS platform domain, it is consumed by an SDP Manager 190, which is responsible for obtaining a list of SDPs available to be installed the local system, downloading an SDP if necessary, installing parts of the SDP into the right places, maintaining a list of those SDPs that have been installed, and, if necessary, uninstalling an SDP by uninstalling all of its parts from the places they were previously installed.

In accordance with an embodiment, the SDP manager can interface with other system components by installing an SME plugin to the CPAS, which can then take responsibility for replicating the SME plugin to other CPAS instances in the cluster, installing the VAB assembly 202, 204 into the VAB deployer, interfacing with other tools such as Enterprise Manager to provide a customized console interface for the service if the service provides one, and installing configuration data for the service into the CPAS. Subsequently, during realization 206 of a service, the service 210 can be realized as an instance of those service types defined by the SDP and installed as assemblies in the VAB repository.

Service Management Engine (SME)

Figure 8:
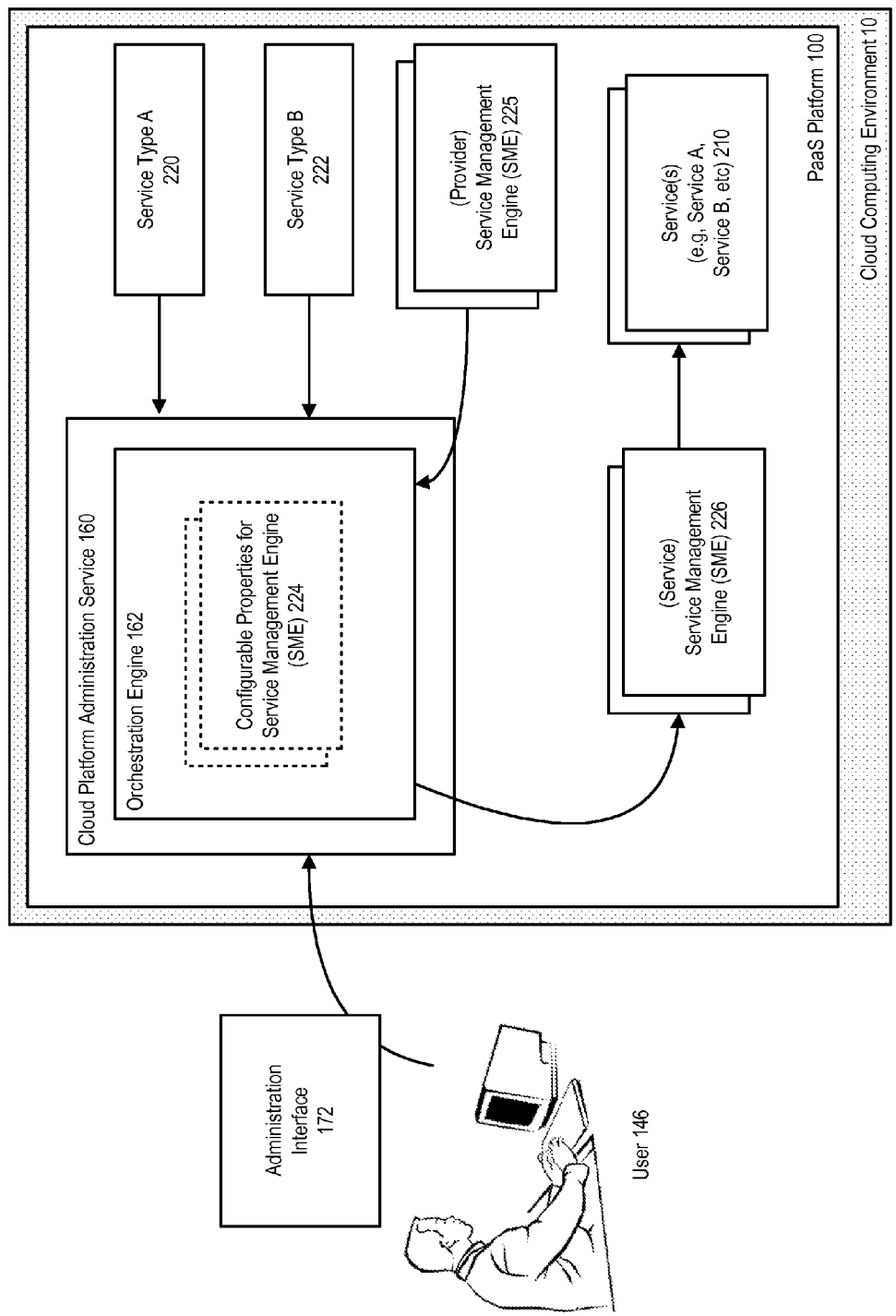
FIG. 8 illustrates the use of a service management engine, in accordance with an embodiment.

FIG. 8 illustrates the use of a service management engine, in accordance with an embodiment. In accordance with an embodiment, a Service Management Engine (SME) provides a generic means to plug any service type into the system. For example, an SME takes care of the service-specific provisioning, lifecycle, management, and monitoring support for a service type or provider type. There can be different classes of SMEs; for example, provider SMEs can be provided to handle different providers. Service SMEs can be dynamically incorporated into the platform domain by installing an appropriate SDP, which are then registered by the SDP manager. The set of registered service SMEs then become the service types that are available to Cloud Account Administrators to create services.

In accordance with an embodiment, each service type supported in the PaaS platform domain maps to a specific service SME. A service SME handles all service-related activities, such as creation, monitoring, management, patching, upgrade, and deletion for that service. In accordance with an embodiment, the contract that is implemented by an SME is referred to as a Service Management Interface (SMI).

Referring to the example shown in FIG. 8, when OVAB is used as a virtualization provider, interaction with the OVAB Deployer can be handled by a virtualization API (e.g., an OVAB client API). In accordance with an embodiment, the orchestration process can then proceed as follows: a Cloud Account Administrator can discover, e.g., SOA service types 220, 222 that are available in the PaaS platform domain, and initiate creation of an, e.g., SOA service. The orchestration engine iterates through the available service SMEs in the system, and determines which service SMEs can handle this service type 224. In this example, the orchestration engine can discover an appropriate SOA SME to handle creation of the SOA service. The orchestration engine can then call into the SME to get all provider dependencies for that SME 225. For example, the SME may return database and load-balancer provider dependencies. The orchestration engine can then call a get-user or similar configurable properties function for the SME, and expose those properties in a user interface, so that the Cloud Account Administrator can edit the properties if desired. User-provided inputs can be supplied to the SME, for example to update an OVAB deployment plan. The orchestration engine then performs any pre-provisioning association between the SME and the provider SMEs upon which it depends. For example, the orchestration engine can perform pre-provisioning association between the SOA SME and a database provider SME, which results in the creation of schema and tables required by the SOA service, in addition to populating the deployment plan with the database provider configuration. When any pre-provisioning association is complete, the orchestration engine can then call into the SME 226 to provision the service.

At this point, the deployment plan is generally complete except for network configurations. In accordance with an embodiment, the deployment plan together with an assembly ID can be pushed, e.g., to the OVAB API, which takes care of filling the deployment plan with the remaining network configurations. Then, the orchestration engine can call, e.g., a Web service API of the OVAB Deployer, to provision the OVAB assembly. Once the assembly is provisioned, the virtual machine information can be retrieved and passed back to the SME, which in turn passes the information back to the orchestration engine. The orchestration engine can then perform any post-provisioning association between the SME and the provider SMEs on which it depends. For example, post-provisioning association between the SOA SME and a load-balancer provider SME may result in the creation of a virtual server to handle and route requests for this SOA service.

Orchestration Engine (OE)

Figure 9:
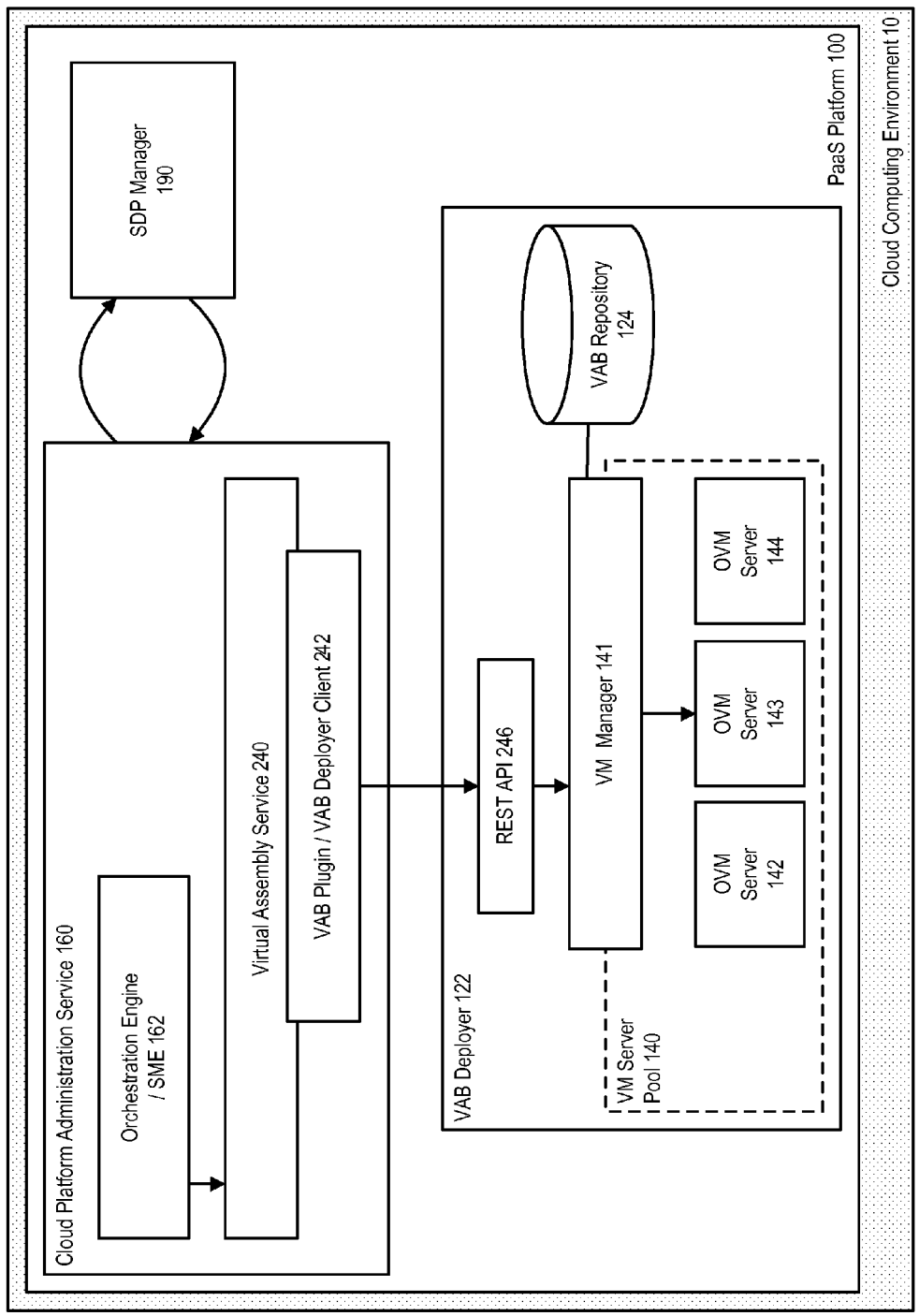
FIG. 9 illustrates the use of an orchestration engine, in accordance with an embodiment.

FIG. 9 illustrates the use of an orchestration engine, in accordance with an embodiment. In accordance with an embodiment, the orchestration engine enables life-cycle management of the services in a PaaS platform. In particular, the orchestration engine coordinates the interactions among various components in the platform domain while creating or managing a service, enables the pluggability of SMEs for various service types in the platform, aids in provisioning the service by selecting appropriate SMEs from among those available in the platform, and helps in managing the configuration of providers such as DB Providers, IDM Providers, and LB Providers.

In accordance with an embodiment, the orchestration engine, as part of creating a service, ensures that dependencies of the service, such as its provider dependencies, are satisfied, by selecting appropriate providers, and coordinating association between the providers and service. The act of association can be performed during pre-provisioning and/or post provisioning-phases. The act of installing and configuring an SME can be performed by the SDP manager as part of registering a pre-packaged service type or a customized service type. The orchestration engine helps expose the deployment plan configuration, which can be configured by the Cloud Account Administrator, including recognizing phases and tasks that match the requirements of the platform for its service creation action, and other life-cycle related activities.

In accordance with an embodiment, the orchestration engine also acts as a gateway for service management, monitoring, scaling actions that could be initiated by other containers in the PaaS platform domain, or by an administrator. For example, the elasticity engine, described in further detail below, can communicate with the orchestration engine to manage, monitor, and scale services based on a service's QoS configuration. The orchestration engine can also play a role in service maintenance actions, such as patching and upgrade, which may require disassociating or re-associating services in a phased manner.

In accordance with an embodiment, services created by a cloud account administrator are visible and accessible only to that particular cloud account (tenant), and are isolated from other cloud accounts in the PaaS platform domain. Such isolation can be provided by the orchestration engine with the help of a cloud account management module.

In accordance with an embodiment, SMEs can be registered with the orchestration engine such that multiple SMEs for a given "family" of service (e.g., "database") can be present in the system. A default SME can also be configured for a particular service family on a per-cloud account basis.

As shown in FIG. 9, in accordance with an embodiment, the orchestration and service management components can interface with the virtualization layer through a virtualization service 240, plugin 242, and virtualization API 246 that abstracts supported virtualization operations. In accordance with an embodiment that uses OVAB, this API can be an OVAB Deployer interface, which enables OVAB Deployer to perform the tasks of assembly creation. In accordance with an embodiment, the orchestration engine/SME can upload and deploys assemblies through the OVAB virtualization API, in addition to managing their lifecycle.

To support developer or demonstration scenarios, in accordance with an embodiment, the system can also implement solutions that run on native OS processes (i.e., with no virtualization). This capability can be implemented by providing a "physical plugin", which implements a portion of the virtualization API.

Elasticity Manager (EM)

Figure 10:
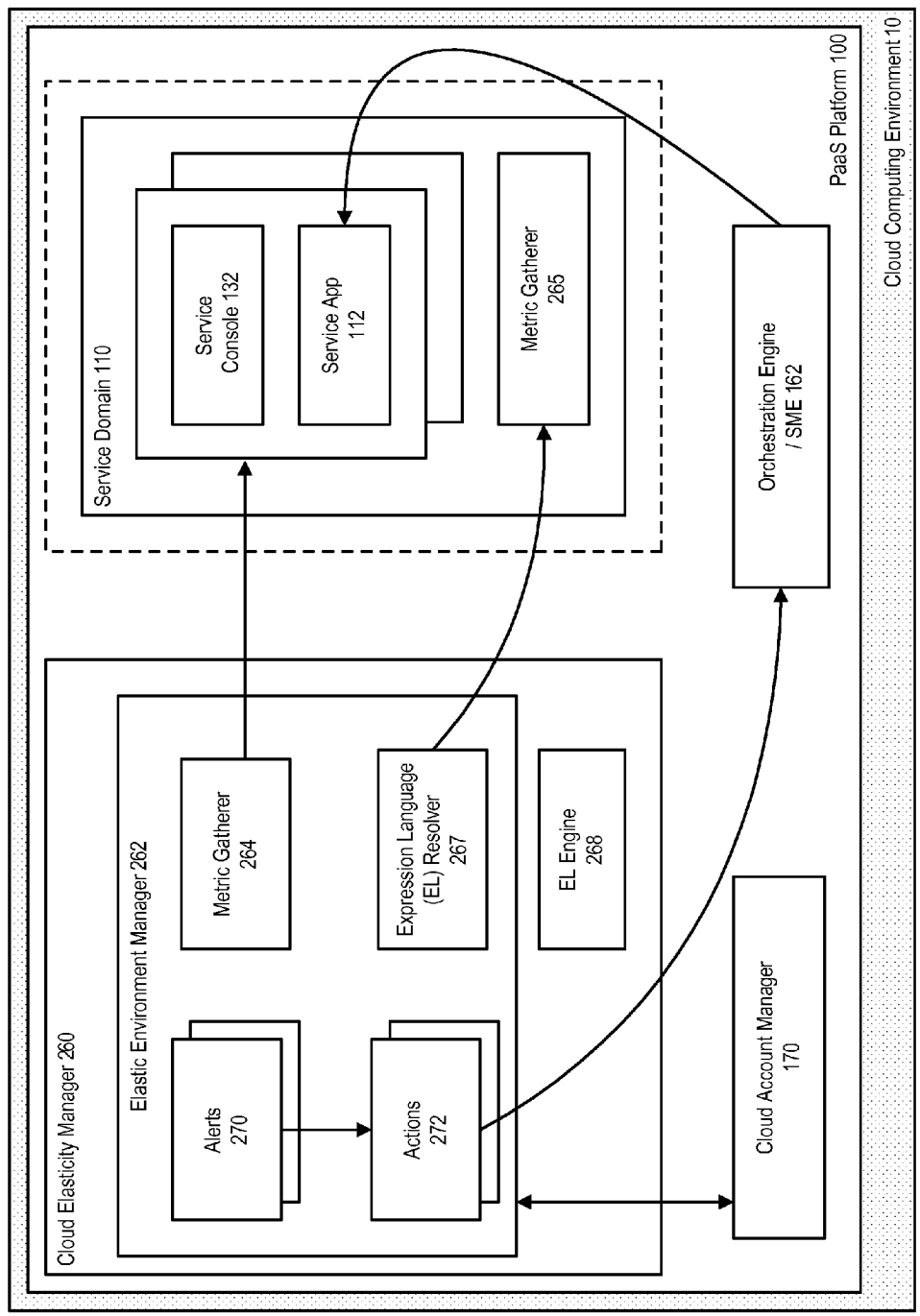
FIG. 10 illustrates the use of an elasticity manager, in accordance with an embodiment.

FIG. 10 illustrates the use of an elasticity manager, in accordance with an embodiment. As shown in FIG. 10, in accordance with an embodiment, the elasticity manager 260, including an environment manager 262, can use metric gatherers 264, 265 and alerts 270, e.g., as HK2 contracts, to determine the health of services running in an environment. Once the state of the environment is determined, the elasticity manager can take appropriate actions 272.

In accordance with an embodiment, a metric gatherer is an object that collects and maintains metric data about a service periodically. For example, a metric gatherer may periodically collect heap statistics such as used or committed memory; or metrics regarding CPU usage. Generally, the metric gatherers provide information about the state of some resource usage. Metrics can also be provided by external monitoring tools, for example by a Java bean component.

In accordance with an embodiment, an alert object periodically checks the health of a service in an environment, by analyzing metric data gathered by one or more metric gatherers over a period of time. For example, an alert may examine CPU usage for a previous several minutes to determine if the environment is under stress. After the alert determines the state of the service or environment, it can execute an action, such as sending an email, logging a message, sending an event, or scaling-up or scaling-down a service. In accordance with an embodiment, an alert can take multiple actions.

In accordance with an embodiment, the elasticity manager can include a unified Expression Language (EL) engine 268, which allows alerts and metric gatherers to be specified as EL expressions. In accordance with an embodiment, the elasticity manager allows external EL Resolver objects 267 to be registered, which enables other types of objects, such as MBeans or POJOs, to be used in an expression.

Update and Patching of SDPs

In accordance with an embodiment, services can be periodically maintained to ensure that they are up-to-date with, e.g., bug fixes, security updates and configuration changes. To help ensure homogeneous environments, services should be updated in a timely manner, with the same set of patches and configuration updates. In accordance with an embodiment, an update is defined to be a change which has to be made to the system; examples of which include application of a security patch, upgrade of a component, or changing of a configuration value. Depending on the type of update, some updates may require a service or system downtime, while other updates may not require a downtime; and each of these scenarios can be taken into account.

Hybrid SME Plugin

In accordance with an embodiment, the system can include a hybrid service management engine (SME) plugin, for use with a PaaS platform or cloud environment.

As described above, an SME provides a means by which a service type can be plugged into a cloud environment to control a service-specific lifecycle, including provisioning, management, and monitoring of a service type.

In accordance with an embodiment, an SME plugin associated with a service type can extend a hybrid SME plugin, to delegate one or more lifecycle operations to be controlled with shell or other scripts. Since a service provider can be associated with an SME that is used for the lifecycle and configuration of its services, the use of a hybrid SME plugin allows shell scripts to be leveraged to assist in the provisioning and control of those services. For example, a shell-based hybrid SME plugin can provide the flexibility to tap into existing shell scripts, for controlling one or more aspects of a service lifecycle.

In accordance with an embodiment, a previously created SME plugin can be configured to extend a hybrid SME plugin. The SMEs API and SME-base modules can provide the necessary contracts and base implementations.

Generally, the runtime requirements for the scripts are the responsibility of the service developers. Service developers who elect to use hybrid plugins need to ensure that the particular runtimes that their scripts may depend on are available as part of the assembly for that SME, or alternatively are installed on the physical plugins for that SME.

As described herein, in accordance with an embodiment, a hybrid SME plugin allows a service developer to write an SME plugin either by using shell scripts, or a combination of Java code and shell scripts. The various phases of an SME lifecycle can be associated with scripts that are identified by listing the scripts in a service definition (e.g., a service-definition.xml file).

In accordance with an embodiment, scripts can be specified as having various levels, to providing a grouping as to where scripts need to be executed. In accordance with various embodiments, the scripts can be run on the cloud platform administration service (CPAS); alternatively, the scripts can be configured to run on all or specific appliances. When run on specific appliances, the hybrid SME plugin for a service can leverage a virtual assembly service API to execute scripts remotely on VMs or remote hosts provisioned for that service.

Figure 11:
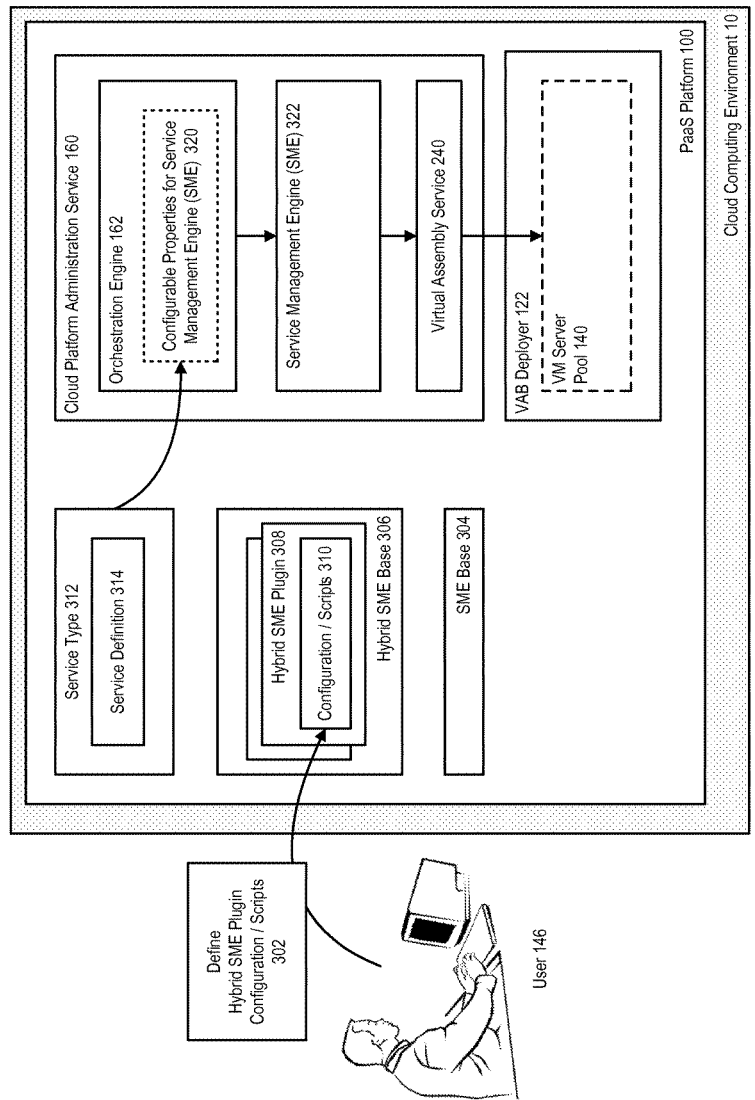
FIG. 11 illustrates the use of a hybrid service management engine plugin, in accordance with an embodiment.

FIG. 11 illustrates the use of a hybrid service management engine plugin, in accordance with an embodiment. As shown in FIG. 11, in accordance with an embodiment, an SME can be associated with an SME base 304 for use in its configuration, which a hybrid SME base 306 can extend.

A service developer or other user can define 302 a hybrid SME plugin 308, using shell scripts and/or other configuration information 310, and associate various phases of a particular SME with one or more scripts, for example by defining a service type 312, and identifying phases and scripts in the corresponding service definition 314 (e.g., a service-definition.xml file).

In accordance with an embodiment, during instantiation of the service type, the configurable properties 320 for an SME are determined, and an appropriate SME 322 is created.

When an SME plugin extends the hybrid SME base, the system determines which code is to be executed while implementing particular phases of the service lifecycle. In accordance with an embodiment, if an SME extends the hybrid SME base, and specifies a script in the service definition, then the specified script is executed for the phase for which it was defined in the service definition. If an SME extends the hybrid SME base, and bundles the script with the default location and name, then the bundled script is executed for that phase for which it was defined. If an SME extends the hybrid SME base, and does not define a script either explicitly in the service definition or in the default location and name, then during the service lifecycle the hybrid SME base delegates to the SME base to execute the appropriate SME phase operations.

Figure 12:
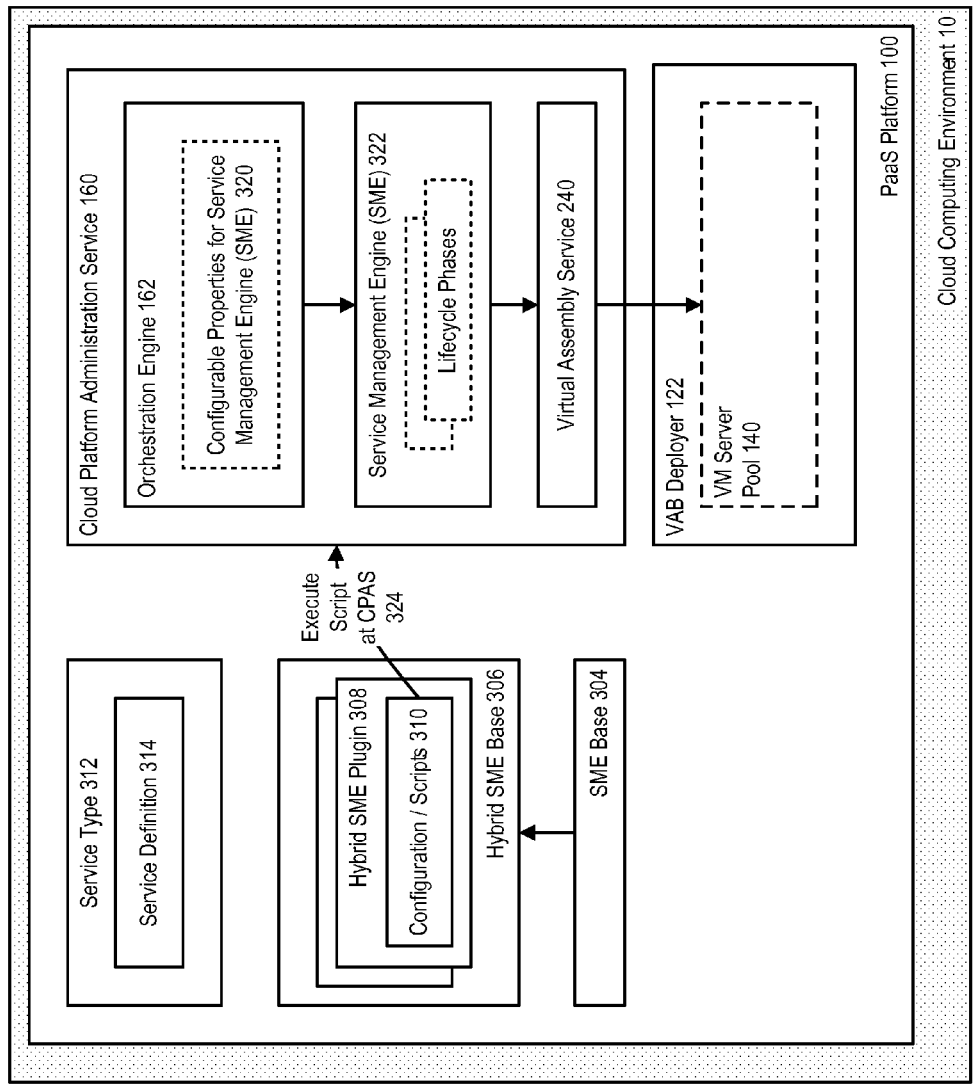
FIG. 12 further illustrates the use of a hybrid service management engine plugin, in accordance with an embodiment.
Figure 12:
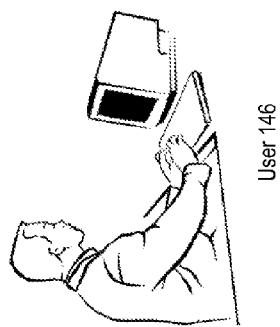

FIG. 12 further illustrates the use of a hybrid service management engine plugin, in accordance with an embodiment. As shown in FIG. 12, when a specified script is executed for a particular phase of the SME lifecycle, depending on the contents of the script it can be executed in the CPAS 324.

Figure 13:
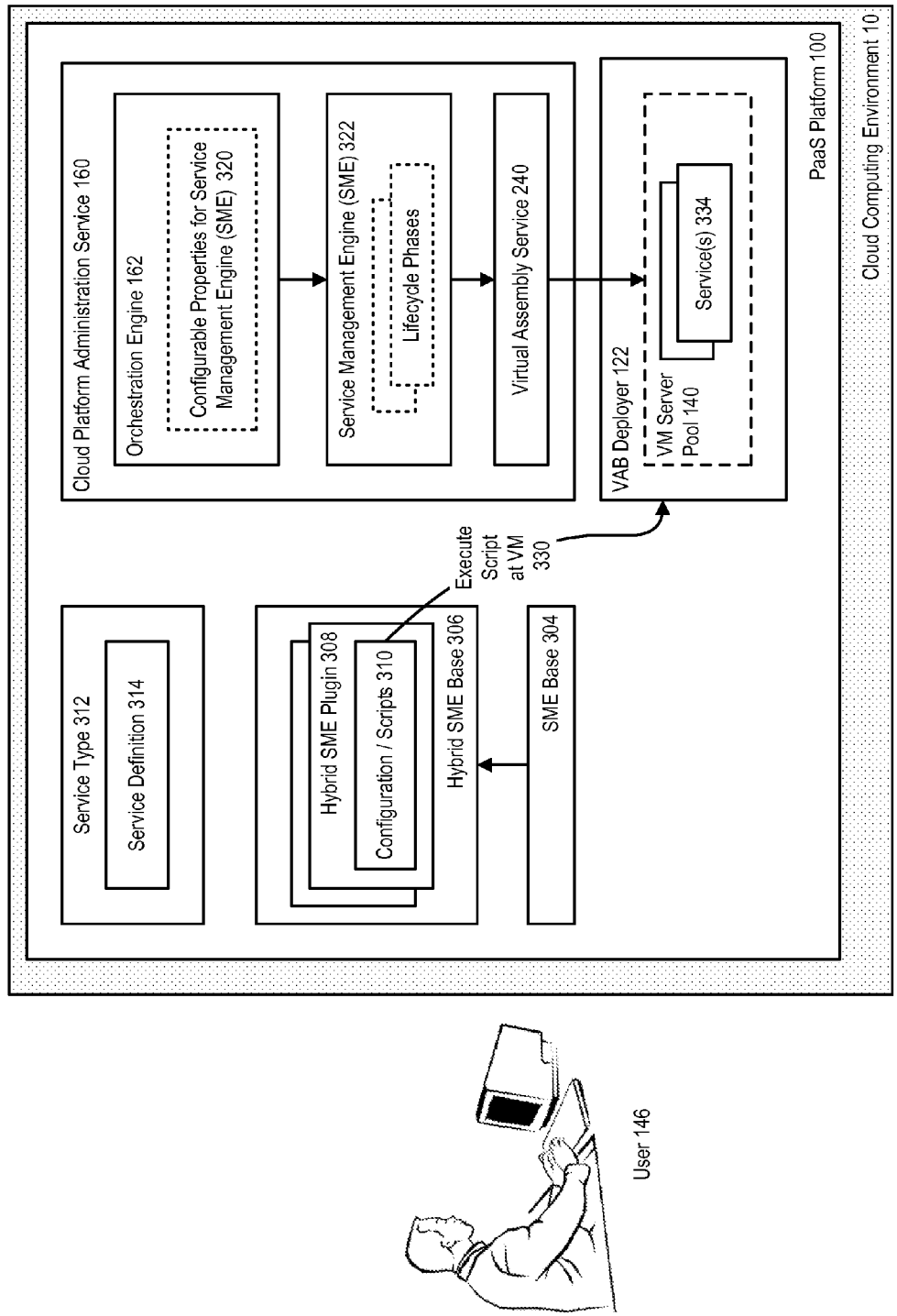
FIG. 13 further illustrates the use of a hybrid service management engine plugin, in accordance with an embodiment.

FIG. 13 further illustrates the use of a hybrid service management engine plugin, in accordance with an embodiment. As shown in FIG. 13, alternative when a specified script is executed for a particular phase of the SME lifecycle, the script can be executed in one or more of the services 334 operating in the server pool.

Figure 14:
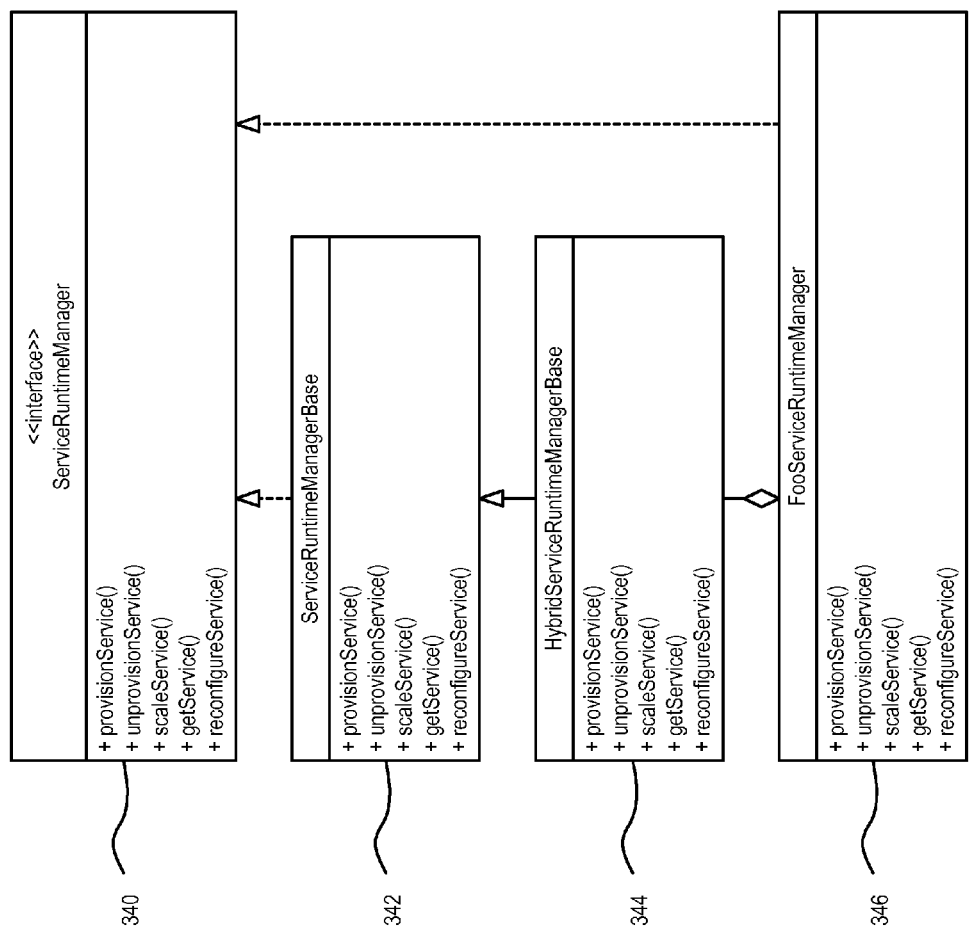
FIG. 14 illustrates how a service management engine plugin can extend a hybrid service management engine base, in accordance with an embodiment.

FIG. 14 illustrates how a service management engine plugin can extend a hybrid service management engine base, in accordance with an embodiment.

As illustrated in the example shown in FIG. 14, the system can support an service (ServiceRuntimeManager) 340, in which the SME base (ServiceRuntimeManagerBase) 342 can, for example, utilize Java for performing operations using virtualization assembly service APIs. A hybrid SME base (HybridServiceRuntimeManagerBase) 344 can use scripts for performing various operations. If the scripts are not available for performing operations then the hybrid SME base will delegate the operation to (ServiceRuntimeManagerBase).

In accordance with an embodiment, the hybrid SME base (HybridService RuntimeManagerBase) can be enhanced to not only support shell scripts but also support other scripts such as PERL, or RUBY, using a JavaScript engine. Another service (FooServiceRuntimeManager) 346 will use the HybridRuntimeManagerBase for runtime management. If the scripts are configured, then the operation is performed with scripts; if not, the operation happens through ServiceRuntimeManagerBase. The scripts can be configured for various operations such as create, start, stop, or destroy.

Execution of Scripts with Hybrid SME Plugin

Figure 15:
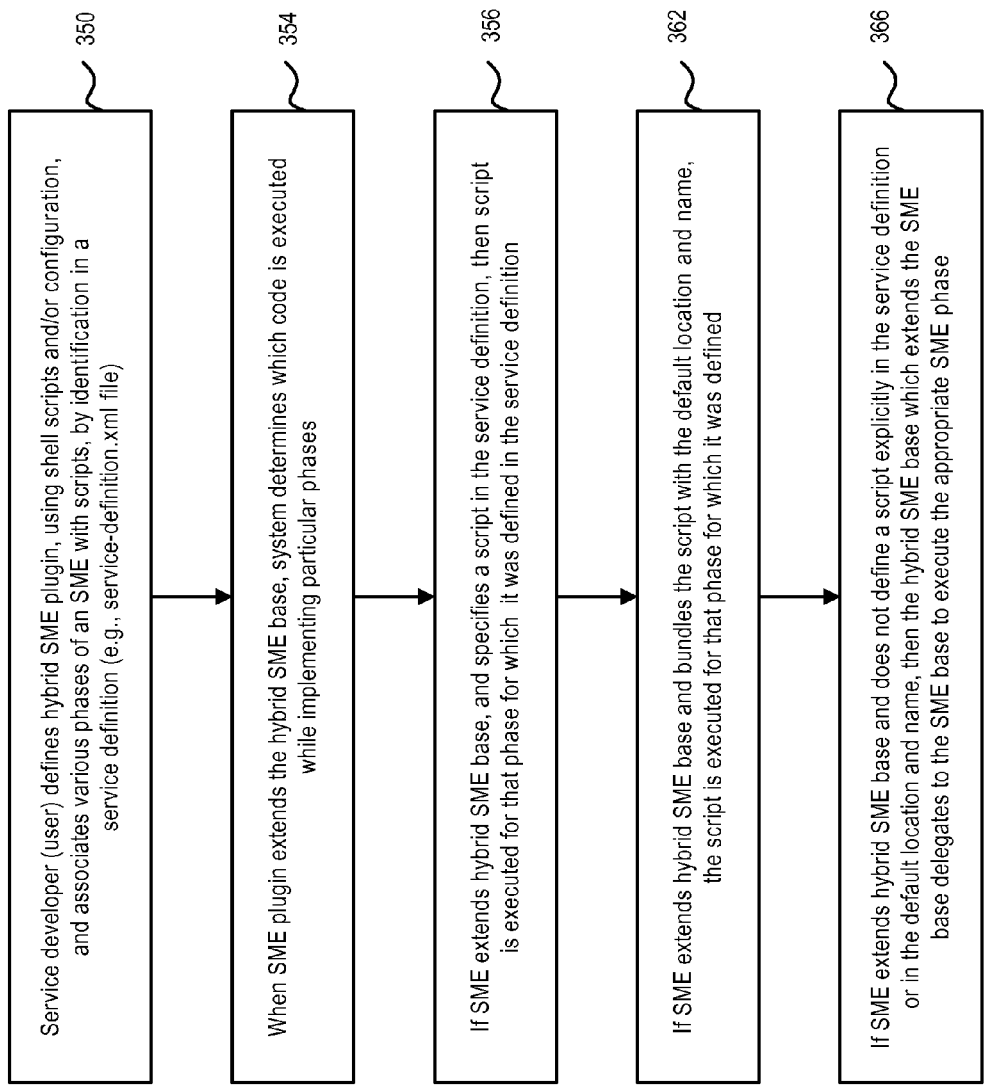
FIG. 15 is a flowchart of a process for using a hybrid service management engine plugin, in accordance with an embodiment.

FIG. 15 is a flowchart of a process for using a hybrid service management engine plugin, in accordance with an embodiment.

As shown in FIG. 15, at step 350, a service developer or other user can define a hybrid SME plugin, using shell scripts and/or other configuration information. The user can associate various phases of a particular SME with one or more scripts, for example by identifying phases and scripts in a service definition (e.g., a service-definition.xml file).

At step 354, when an SME plugin extends the hybrid SME base, the system determines which code is to be executed while implementing particular phases of the service lifecycle. If the SME plugin extending the Hybrid plugin base overrides the specific phase, it can choose to do so using either Java code or scripts. It is up to the SME to implement the particular phase. In addition to the phase, the SME will need to implement Service or extend ServiceBase and make the various URIs (Service admin and end user URIs) available.

At step 356, if an SME extends the hybrid SME base, and specifies a script in the service definition, then the specified script is executed for the phase for which it was defined in the service definition.

At step 362, if an SME extends the hybrid SME base, and bundles the script with the default location and name, then the bundled script is executed for that phase for which it was defined.

At step 366, if an SME extends the hybrid SME base, and does not define a script either explicitly in the service definition or in the default location and name, then during the service lifecycle the hybrid SME base which extends the SME base delegates to the SME base, to execute the appropriate SME phase operations.

Script Execution Environment

In accordance with an embodiment, in a Unix environment, scripts can be run using a Bourne shell located at /bin/sh. In a Windows environment, a standard DOS shell can be used. When a script is run within CPAS, the script can be executed with a same user identification as the CPAS is running. When a script is run on an appliance, the script can run as the ssh user associated with the service.

In accordance with an embodiment, the service definition (e.g., service-definition.xml file) can contain metadata that defines parameters and properties for the service, which can then be set as environment variables. Parameters and properties declared at the service level can be set on the CPAS for scripts that execute on the CPAS. Parameters or user-parameters declared at the appliance level can be set as environment variables when executing scripts on the appliances. Parameter names that are illegal in a particular shell (e.g., "-" can be automatically substituted with alternate names where appropriate).

Script Packaging

In accordance with an embodiment, scripts can be packaged or otherwise specified by explicitly setting file-parameter elements in the global level of the service definition (e.g., service-definition.xml file), for example:

```xml
<file-parameter
  name="gf-assembly:stop"
  file="scripts/gf-assembly/gf-assembly_stop"
/>
```

In accordance with an embodiment, only one script file should be used per SME lifecycle phase. The entity which the script file should be run on can be determined by the context of its location within the service definition. For example, in the service definition illustrated above, the name could then be simply "stop", and the file-parameter could be located under the gf-assembly element.

Example Usage

In accordance with an embodiment, provided below is an example illustrating how a service can be provisioned to leverage the hybrid SME base.

In the example shown, a service FooService wants to leverage the hybrid SME base. To accomplish this, the FooService SME plugin can extend the hybrid SME base plugin, for example, by declaring a FooServiceRuntimeManager class that extends the HybridServiceRuntimeManager class associated with the hybrid SME base plugin.

```
@Service
public class FooServiceRuntimeManager
extends HybridServiceRuntimeManager {
}
```

If the FooService plugin chooses to implement certain aspects of the ServiceRuntimeManager, then it can do so in the FooServiceRuntimeManager.

In the example shown above, none of the methods are overridden in FooServiceRuntimeManager, so the system can use the implementation from the HybridServiceRuntimeManager and its base class (ServiceRuntimeManagerBase, where scripts are not provided). In this example, scripts are used for only some of the phases, to illustrate how the code from the ServiceRuntimeManagerBase will handle some aspects of the SME plugin, as none of its methods are overridden in FooServiceRuntimeManager.

In accordance with an embodiment, the scripts can be defined in a service-definition.xml, for example as shown below:

```xml
<?xml version="1.0" encoding="UTF-8"?>
<service-definition
xmlns="http://www.oracle.com/ns/cloudlogic/service-definition_1_0"
xmlns:xsi="http://www.w3.org/2001/XMLSchema-instance"
xsi:schemaLocation=
"http://www.oracle.com/ns/cloudlogic/service-definition_1_0
http://www.oracle.com/ns/cloudlogic/service-definition_1_0/service-definition.xsd"
name="Java-Service-Lite"
vendor="Oracle" version="1.0">
<tenancy model="ANY"/>
<characteristics>
<family>JavaEE</family>
</characteristics>
<service-management-engine id="org.glassfish.paas.shellplugin">
<file>
<location>test-paas.shellplugin.jar</location>
</file>
</service-management-engine>
<assembly name="glassfish">
<assembly-reference id="glassfish">
<location>physical-assembly.zip</location>
</assembly-reference>
....
```

-continued

```xml
<appliance name="glassfish"
member-path="glassfish3/glassfish/domains/physical-domain">
.....
</appliance>
</assembly>
....
</service-definition>
```

The example class and service definitions shown above are provided for purposes of illustration. In accordance with various embodiments, different and/or additional class and services definitions can be used.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for provisioning or controlling services in a cloud environment, using a hybrid service management engine plugin, comprising:
one or more computers comprising a hardware processor and memory, wherein the one or more computers provide a cloud environment executing thereon;
a platform component provided within the cloud environment, that supports provisioning of enterprise applications as services within the cloud environment;
one or more service management engines, including
for each service type, of one or more service types, a service management engine associated with that service type that is used to provision and control that service type, including
wherein each service type is defined by a service definition, and wherein each service management engine controls a lifecycle of its associated service type; and a hybrid service management engine plugin, that supports provisioning and control of services using scripts, wherein, for a particular service type, a particular service management engine that is associated with the particular service type and controls a lifecycle for the particular service type extends the hybrid service management engine plugin, to delegate one or more lifecycle operations for the particular service type to be controlled with a script, including determining that the particular service management engine extends the hybrid service management engine plugin and specifies the script for use with a particular phase of the lifecycle for the particular service type, and in response to determining that the particular service management engine extends the hybrid service management engine plugin and specifies the script for use with the particular phase of the lifecycle for the particular service type, executing the script for the particular phase of the lifecycle for which the script is specified.

2. The system of claim 1, wherein the one or more lifecycle operations include one or more provisioning steps used to provision the particular service type.

3. The system of claim 1, wherein provisioning of the particular service type is performed in phases, wherein the particular service management engine delegates one or more of the phases and its lifecycle operations to the scripts.

4. The system of claim 1, wherein one or more delegated lifecycle operations are executed remotely on virtual machines or remote hosts provisioned for the particular service.

5. The system of claim 1, wherein various phases of a service management engine lifecycle can be associated with scripts that are identified by a corresponding service definition file; and wherein the hybrid service management engine plugin associates the various phases of the particular service management engine with one or more scripts, including identifying phases and scripts in the corresponding service definition file.

6. The system of claim 1, whereupon the service management engine extending the hybrid service management engine plugin, and specifying a script in a corresponding service definition, then the specified script is executed for the particular phase of the lifecycle for which it was defined in the service definition.

7. The system of claim 1, wherein the system includes a plurality of service types, and a plurality of service management engines that are associated with the plurality of service types.

8. The system of claim 7, wherein each service management engine of the plurality of service management engines controls a service-specific lifecycle, including provisioning, management, and monitoring of its associated service type.

9. A method of provisioning or controlling services in a cloud environment, using a hybrid service management engine plugin, comprising:

providing one or more computers including a cloud environment executing thereon;

providing a platform component within the cloud environment, that supports provisioning of enterprise applications as services within the cloud environment;

providing one or more service management engines, including for each service type, of one or more service types, a service management engine associated with that service type that is used to provision and control that service type, including wherein each service type is defined by a service definition, and wherein each service management engine controls a lifecycle of its associated service type; and providing a hybrid service management engine plugin, that supports provisioning and control of services using scripts, wherein, for a particular service type, a particular service management engine that is associated with the particular service type and controls a lifecycle for the particular service type extends the hybrid service management engine plugin, to delegate one or more lifecycle operations for the particular service type to be controlled with a script, including determining that the particular service management engine extends the hybrid service management engine plugin and specifies the script for use with a particular phase of the lifecycle for the particular service type, and in response to determining that the particular service management engine extends the hybrid service management engine plugin and specifies the script for use with the particular phase of the lifecycle for the particular service type, executing the script for the particular phase of the lifecycle for which the script is specified.

10. The method of claim 9, wherein the one or more lifecycle operations include one or more provisioning steps used to provision the particular service type.

11. The method of claim 9, wherein provisioning of the particular service type is performed in phases, wherein the particular service management engine delegates one or more of the phases and its lifecycle operations to the scripts.

12. The method of claim 9, wherein one or more delegated lifecycle operations are executed remotely on virtual machines or remote hosts provisioned for the particular service.

13. The method of claim 9, wherein various phases of a service management engine lifecycle can be associated with scripts that are identified by a corresponding service definition file; and wherein the hybrid service management engine plugin associates the various phases of the particular service management engine with one or more scripts, including identifying phases and scripts in the corresponding service definition file.

14. The method of claim 9, whereupon the service management engine extending the hybrid service management engine plugin, and specifying a script in a corresponding service definition, then the specified script is executed for the particular phase of the lifecycle for which it was defined in the service definition.

15. A non-transitory computer readable storage medium, including instructions stored thereon which when read and executed by one or more computers cause the one or more computers to perform the steps comprising:

providing one or more computers including a cloud environment executing thereon;

providing a platform component within the cloud environment, that supports provisioning of enterprise applications as services within the cloud environment;

providing one or more service management engines, including
- for each service type, of one or more service types, a service management engine associated with that service type that is used to provision and control that service type, including
  - wherein each service type is defined by a service definition, and
  - wherein each service management engine controls a lifecycle of its associated service type; and
providing a hybrid service management engine plugin, that supports provisioning and control of services using scripts, wherein, for a particular service type, a particular service management engine that is associated with the particular service type and controls a lifecycle for the particular service type extends the hybrid service management engine plugin, to delegate one or more lifecycle operations for the particular service type to be controlled with a script, including
- determining that the particular service management engine extends the hybrid service management engine plugin and specifies the script for use with a particular phase of the lifecycle for the particular service type, and
- in response to determining that the particular service management engine extends the hybrid service management engine plugin and specifies the script for use with the particular phase of the lifecycle for the particular service type, executing the script for the particular phase of the lifecycle for which the script is specified.

16. The non-transitory computer readable storage medium of claim 15, wherein the one or more lifecycle operations include one or more provisioning steps used to provision the particular service type.

17. The non-transitory computer readable storage medium of claim 15, wherein provisioning of the particular service type is performed in phases, wherein the particular service management engine delegates one or more of the phases and its lifecycle operations to the scripts.

18. The non-transitory computer readable storage medium of claim 15, wherein one or more delegated lifecycle operations are executed remotely on virtual machines or remote hosts provisioned for the particular service.

19. The non-transitory computer readable storage medium of claim 15, wherein various phases of a service management engine lifecycle can be associated with scripts that are identified by a corresponding service definition file; and
- wherein the hybrid service management engine plugin associates the various phases of the particular service management engine with one or more scripts, including identifying phases and scripts in the corresponding service definition file.

20. The non-transitory computer readable storage medium of claim 15, whereupon the service management engine extending the hybrid service management engine plugin, and specifying a script in a corresponding service definition, then the specified script is executed for the particular phase of the lifecycle for which it was defined in the service definition.

* * * * *

UNITED STATES PATENT AND TRADEMARK OFFICE
CERTIFICATE OF CORRECTION

| | | |
|---|---|---|
| PATENT NO. | : 9,843,487 B2 | Page 1 of 1 |
| APPLICATION NO. | : 14/207256 | |
| DATED | : December 12, 2017 | |
| INVENTOR(S) | : Mordani et al. | |

It is certified that error appears in the above-identified patent and that said Letters Patent is hereby corrected as shown below:

In the Specification

In Column 2, Line 6, after "embodiment" insert -- . --.

In Column 2, Line 9, after "embodiment" insert -- . --.

In Column 2, Line 13, after "embodiment" insert -- . --.

In Column 3, Line 33, delete "Accordance" and insert -- accordance --, therefor.

In Column 13, Line 66, delete "(HybridService RuntimeManagerBase)" and insert -- (HybridServiceRuntimeManagerBase) --, therefor.

Signed and Sealed this
Tenth Day of July, 2018

Andrei Iancu
*Director of the United States Patent and Trademark Office*